Figure 1:
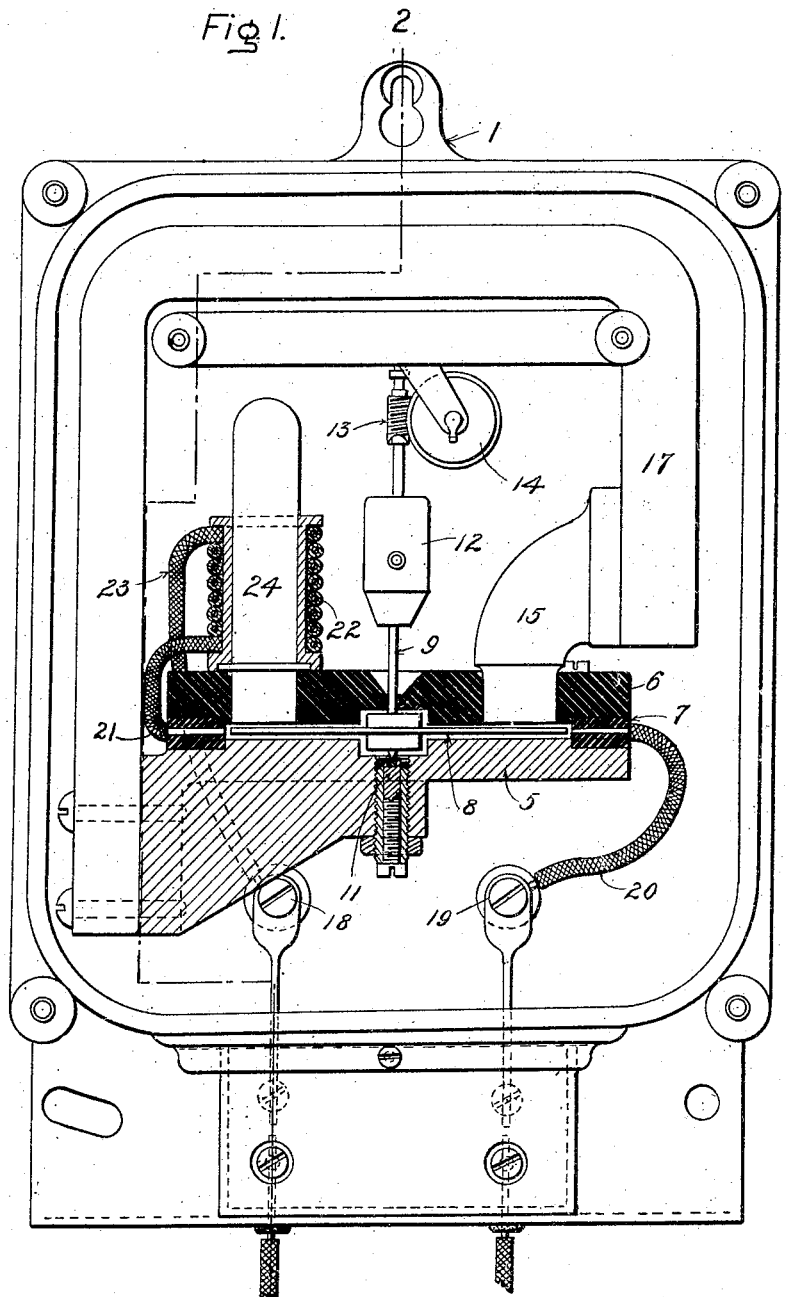

No. 896,999. PATENTED AUG. 25, 1908.
W. J. LLOYD.
METER.
APPLICATION FILED OCT. 2, 1905.

2 SHEETS—SHEET 1.

Witnesses:
M. Crozier
Helen Oxford

Inventor:
William J. Lloyd
by Albert H. Davis
Atty.

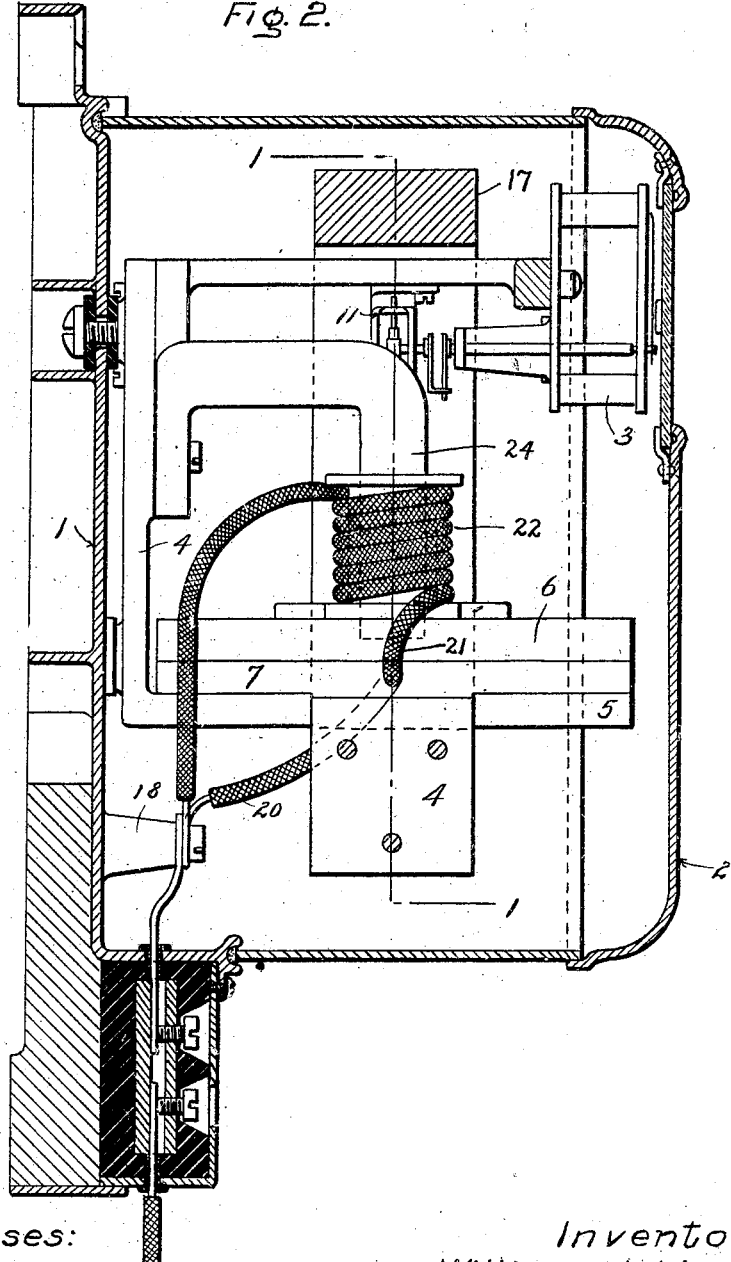

UNITED STATES PATENT OFFICE.

WILLIAM J. LLOYD, OF RUGBY, ENGLAND, ASSIGNOR TO GENERAL ELECTRIC COMPANY, A CORPORATION OF NEW YORK.

METER.

No. 896,999.  Specification of Letters Patent.  Patented Aug. 25, 1908.

Application filed October 2, 1905. Serial No. 280,914.

*To all whom it may concern:*

Be it known that I, WILLIAM J. LLOYD, a citizen of the United States, residing at Rugby, England, have invented certain new and useful Improvements in Meters, of which the following is a specification.

This invention relates to integrating electric meters and more particularly to the type of electric meters in which the armature of the meter motor is immersed in a bath of mercury. In these meters the current to be measured, or a definite portion thereof, flows through the armature of the meter motor which is immersed in mercury and mounted for rotation in the field of a permanent or electro-magnet so that the armature tends to rotate at a speed proportional to the current flowing in the circuit. The rotation of the armature is retarded by eddy currents generated in the armature by its rotation in the magnetic field, or by a separate disk on the meter shaft rotating in an additional field. As thus constructed the meter would give a very accurate registration of the current flowing in the circuit were it not for the disturbing influence of fluid friction, which increasing as the speed of rotation of the armature increases makes the readings more and more inaccurate as the current to be measured increases.

The object of my invention is to overcome this objectionable characteristic by providing means for compensating for the fluid friction.

In accordance with my invention I provide the meter motor with means for developing an additional driving torque which is proportional, or approximately so, to the square of the current to be measured, the amount of this torque being so regulated as to be sufficient to compensate as nearly as practicable for the retardation of the motor armature due to the friction of the mercury in which it is immersed. This additional torque is obtained by means of a coil connected in series with the armature of the motor and arranged to develop a magnetic field independent of the permanent magnet which reacts upon the current in the armature so as to give a rotational effect sufficient to compensate for the retarding effect of the fluid friction. The compensating magnet is preferably not only independent of the permanent magnet, but placed on the opposite side of the armature to reduce to a minimum the liability of the permanent magnet being affected by the current in the compensating coil.

The novel features of my invention will be definitely indicated in the claims appended hereto.

The details of the construction and the mode of operation of my improved mercury meter will be better understood by reference to the following description taken in connection with the accompanying drawings which illustrate one embodiment of my invention and in which Figure 1 is a front view of the meter with parts in section on line 1—1 of Fig. 2; and Fig. 2 is a section of the meter on line 2—2 of Fig. 1.

Referring to the drawings, the parts of the meter are inclosed in a casing consisting of a back 1 and cover 2, the latter being provided with a window through which the dial 3 may be seen. Secured to the back 1 is a member 4 of iron or other material of good magnetic permeability the lower portion of which extends forward horizontally and is of circular shape. This horizontal portion forms the bottom plate 5 of the mercury receptacle. Directly above the bottom plate 5 is a disk 6 of insulating material spaced apart from plate 5 by a washer 7 also of insulating material so as to form between the disk 5 of iron and the disk 6 of insulating material a shallow circular chamber in which the armature 8 of the meter motor is adapted to rotate in a bath of mercury. Armature 8 is carried by a shaft 9 mounted for rotation in suitable bearings 11 11 and carrying a weight 12 which offsets the buoyancy of the armature when immersed in the mercury. Shaft 9 also carries a worm 13 which meshes with a worm-wheel 14 and thus drives the dial train 3 of the meter. In the disk 6 is an opening and one end of a pole-piece 15 fits tightly into this opening and extends in proximity to the armature 8; the other end of the pole-piece is secured in any suitable manner to one end of a permanent magnet 17. The other end of magnet 17 is secured to the plate 5 which forms the bottom of the mercury chamber so that a strong magnetic field is developed passing through the armature 8 and the mercury bath between the pole-piece 15 and the disk 5.

Mounted on the back 1 of the meter casing are two binding-posts 18 and 19 by which the meter is connected in circuit in the usual manner. A lead 20 extends from the binding-post 19 through the washer 7 to the mercury chamber and at a point diametrically opposite a lead 21 also extends through the washer 7 to the mercury chamber so that the current flows from binding-post 19 through lead 20 to the mercury then diametrically across the armature 8 and out by the lead 21. Above the disk 6 I provide the coil 22 to compensate for the fluid friction. This coil is connected in series with the armature 8 between the binding-posts 18 and 19 by having one end connected to the lead 21 and the other connected by a lead 23 with the binding-post 18. The coil 22 is so wound and positioned that it produces a magnetic flux across the disk armature which interacts with the current in the armature to produce a torque assisting that due to the field of the permanent magnet 17 and the current in the armature. If desired, coil 22 may be mounted on a soft iron core 24, the lower end of which may be embedded in the disk 6 or may extend through an opening in the disk and in proximity to the armature 8. The upper end of core 24 may be connected to the member 4, as shown in Fig. 2, so as to reduce the reluctance of the path for the flux of coil 22. Coil 22 and core 24 are preferably located on the side of shaft 9 opposite from that of pole-piece 15, as shown in Fig. 1, and the current to be measured is arranged to flow diametrically across the armature 8 so that the torque due to the permanent magnet 17 is exerted on one side of the shaft and the torque of the fluid friction compensating coil on the opposite side. In this way coil 22 is removed as far as possible from the permanent magnet so as to decrease the danger of changes in the strength of the permanent magnet 17 resulting from the passage of excessive currents through the coil 22.

The operation of the meter as thus described will be readily understood. As the current to be measured increases the speed of rotation of armature 8 increases and with it the retarding effect of fluid friction. However, as the current to be measured increases the torque-producing effect of coil 22 also increases since this coil is connected in series with the armature 8 and the coil is so proportioned that the reaction of the flux due to the coil on the current in armature 8 develops a torque which just compensates for the disturbing influence of the fluid friction. Since the coil 22 and the armature 8 are connected in series, the torque developed thereby varies approximately with the square of the current flowing through them. The braking effect of eddy currents generated in the disk armature 8 by its rotation in the field established by coil 22 also increases approximately with the square of the armature speed which is proportional to the current flowing therethrough. But owing to the low speed of the moving element of the meter and the low density of the flux of coil 22 this retarding effect is very small and is unimportant.

It will be apparent that the invention may be carried out in different ways from that above described and that it is not limited in its operation to the particular form of meter which I have chosen for purposes of illustration; I therefore do not wish to be understood as limited to the construction which I have shown.

What I claim as new, and desire to secure by Letters Patent of the United States, is,—

1. An electric meter comprising means for establishing a magnetic field, a receptacle containing a conducting liquid located in said field, an armature rotatable in said receptacle, leads entering said receptacle and having their ends electrically connected by the conducting liquid and the armature, and a coil connected in series with the armature and arranged to produce an independent magnetic field through the armature and influencing the armature at a portion thereof uninfluenced by the other magnetic field.

2. An electric meter comprising a permanent magnet, a receptacle containing a conducting liquid located in a field produced by said magnet, an armature rotatable in the receptacle, leads entering the receptacle and arranged to be electrically connected independent of the permanent magnet through the conducting liquid and the armature, and an electromagnet having its energizing coil connected in series with the armature and arranged to develop magnetic flux intersecting the armature at a portion thereof uninfluenced by the permanent magnet.

3. An electric meter comprising a receptacle, a conducting liquid therein, a rotatable shaft, an armature rotatable in the receptacle carried by the shaft, leads entering the mercury receptacle at diametrically opposite points to connect the armature in circuit, a permanent magnet whose field intersects the armature on one side of the shaft, and a coil connected in series with the armature and arranged to develop a magnetic flux intersecting the armature on the opposite side of the shaft.

In witness whereof, I have hereunto set my hand this 22nd day of September, 1905.

WILLIAM J. LLOYD.

Witnesses:
ERNEST HARKER,
S. G. WEBB.